United States Patent
Fujii et al.

[11] Patent Number: 5,971,311
[45] Date of Patent: Oct. 26, 1999

[54] PHOTO FILM CASSETTE, AND METHOD OF ATTACHING LIGHT-TRAPPING FABRIC TO

[75] Inventors: Akihiko Fujii, Kanagawa; Masazumj Tomoda, Fukui, both of Japan

[73] Assignees: Fuji Photo Film Co., Ltd., Kanagawa; Seiren Co., Ltd., Fukui, both of Japan

[21] Appl. No.: 08/859,718

[22] Filed: May 21, 1997

[30] Foreign Application Priority Data

May 21, 1996 [JP] Japan ................................. 8-125744

[51] Int. Cl.$^6$ ........................... G03B 23/02; G03B 17/26
[52] U.S. Cl. ............................. 242/348.4; 242/588.5; 396/513
[58] Field of Search ..................... 242/348.4, 588.5, 242/538.4; 396/513

[56] References Cited

U.S. PATENT DOCUMENTS 5,234,176  8/1993  Mizumo ........................... 242/348.4
5,275,283  1/1994  Akao ............................... 242/348.4

FOREIGN PATENT DOCUMENTS 37-21388   8/1962   Japan.
61-34526  10/1986   Japan.
7-301888  11/1995   Japan.

*Primary Examiner*—John Q. Nguyen
*Attorney, Agent, or Firm*—Sughrue, Mion, Zinn, Macpeak & Seas, PLLC

[57] ABSTRACT

A photo film cassette contains photo film wound in a roll form, and includes a passage port which has first and second walls between which the photo film is passed. The light-trapping fabric includes a base fabric having first and second surfaces. Pile threads are disposed to protrude from the first surface of the base fabric, for preventing ambient light from entry into the photo film cassette between the first and second walls. In the course of manufacturing the photo film cassette, before attaching the light-trapping fabric, the pile threads are previously bent in a position thereof. The light-trapping fabric is pressed against the first or second wall with a pressing roller, for attaching the second surface to the passage port. An extent of bending the pile threads is enlarged by the pressing roller during the attachment to impart a V-shape to the pile threads.

7 Claims, 8 Drawing Sheets

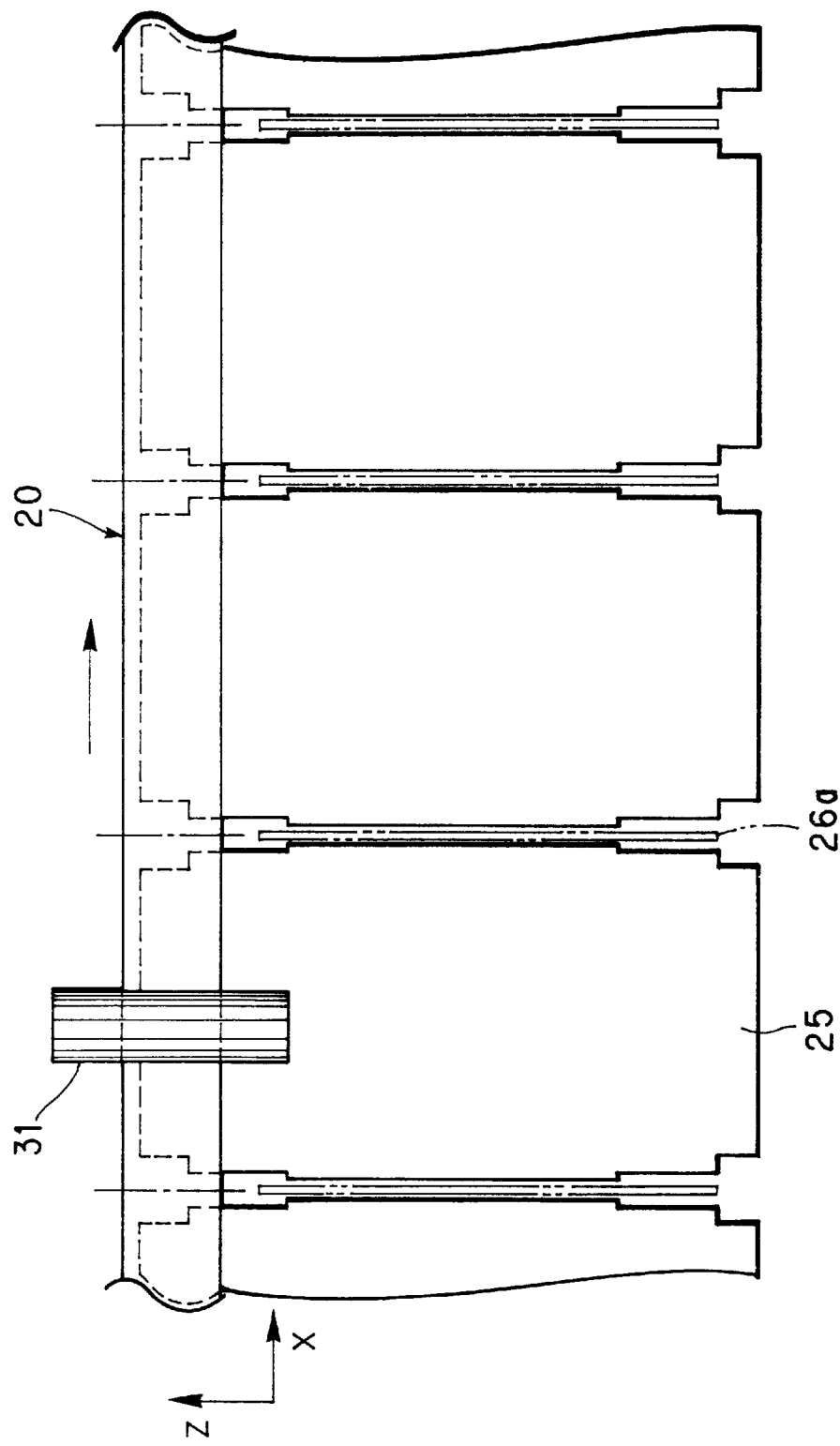

PHOTO FILM CASSETTE, AND METHOD OF ATTACHING LIGHT-TRAPPING FABRIC TO

BACKGROUND OF THE INVENTION

1. Field of the Invention

The present invention relates to a photo film cassette, and a method of attaching light-trapping fabric to the same. More particularly, the present invention relates to a photo film cassette of which light-trapping fabric allows passage of photo film with a relatively small torque for a spool, and at the same time has a high light-trapping capability, and a method of attaching such light-trapping fabric to the same cassette.

2. Description Related to the Prior Art

A photo film cassette has a cassette shell for containing photo film. A magazine has a body for containing photographic paper or other photosensitive material. Either of the photo film cassette or the magazine has a passage port or slot, on the inside of which there is attached a light-trapping fabric or ribbon, which is referred to as plush in the field of photosensitive material JP-Y (Japanese Utility Model Publication No.) 37-21388 discloses a woven structure of the light-trapping fabric including a woven base fabric and pile threads woven to protrude from the base fabric JP-Y (Japanese Utility Model Publication No.) 61-34526 discloses a knitted structure of the light-trapping fabric including a knitted base fabric and pile threads knitted to protrude from the base fabric.

To produce the pile-knitted fabric, a double raschel knitting machine is used. The knitting machine knits two fabrics at one time in a state where two base fabrics are interconnected by the pile threads. The pile threads are then cut in the central position, so as to obtain two products of the pile-knitted fabric which has a continuous belt-shape, and in which the pile threads being short protrude from one surface of the base fabric. JP-A (Japanese Patent Laid-open Publication No.) 7-301888, which is a commonly assigned Japanese patent application, discloses a method in which a plurality of the cassette shell, are arranged on one line, the light-trapping fabric being long is attached to the plural cassette bodies consecutively, before the light-trapping fabric is cut piece from piece to obtain a plurality of separated cassette bodies.

The light-trapping fabric after the center cutting has pile threads all of which are bent and inclined in one direction, so that the light-trapping fabric has a reduced thickness. A pressing roller is used for applying pressure, which presses the light-trapping fabric against each of two walls inside the photo film passage port of the cassette shell. In the application of the pressure, the cassette shell and the pressing roller are moved relative to one another in a direction opposite to the inclination of the pile threads, for the purpose of erecting the pile threads. However erection of the pile threads remarkably raises resistance to an operation of drawing the photosensitive material. It is likely that gaps, such as pinholes, are formed between the pile threads, and light-trapping capability for the photo film passage port is degraded.

SUMMARY OF THE INVENTION

In view of the foregoing problems, an object of the present invention is to provide a photo film cassette of which light-trapping fabric allows passage of photo film with a relatively small torque for a spool, and a method of attaching such light-trapping fabric to the same cassette.

Another object of the present invention is to provide a photo film cassette of which light-trapping fabric has a high light-trapping capability, and a method of attaching such light-trapping fabric to the same cassette.

In order to achieve the above and other objects and advantages of this invention, a container contains photosensitive material wound in a roll form, and includes a passage port which has first and second walls between which the photosensitive material is passed. The light-trapping fabric includes a base fabric having first and second surfaces. Pile threads are disposed to protrude from the first surface of the base fabric, for preventing ambient light from entry into the container between the first and second walls. Before attaching the light-trapping fabric, the pile threads are previously bent in a position thereof. The light-trapping fabric is pressed against the first or second wall with a pressing roller, for attaching the second surface to the passage port, an extent of the bending of the pile threads being enlarged by the pressing roller during the attachment to impart a V-shape to the pile threads.

Furthermore, each of the pile threads includes a root portion disposed to extend from the first surface, and inclined in a first direction on the first surface after being pressed by the pressing roller. A tip portion is disposed to extend from the root portion, and inclined in a second direction opposite to the first direction.

The container includes a tubular portion, substantially having a cylindrical shape, and formed by rounding a substantially rectangular plate, the first and second walls being located respectively on first and second opposite sides of the rectangular plate. First and second caps are fitted on respective ends of the tubular portion.

In the attaching method, the rectangular plate is conveyed while the first side is kept oriented along a predetermined path. While the rectangular plate is conveyed, the light-trapping fabric is supplied between the pressing roller and the rectangular plate substantially in parallel with the predetermined path of the rectangular plate, the light-trapping fabric being pressed against the rectangular plate by the pressing roller.

In the present invention, a photo film cassette includes a spool about which photo film is wound in a roll form, and a cassette shell for containing the spool in a rotatable manner, the cassette shell including a passage port which has first and second walls between which the photo film is passed. The photo film cassette has a first light-trapping fabric including (a) a first base fabric attached to the first wall, and (b) a first group of pile threads, disposed to protrude from the first base fabric, for preventing ambient light from entry into the cassette shell between the first and second walls. A second light-trapping fabric includes (A) a second base fabric attached to the second wall, and (B) a second group of pile threads, disposed to protrude from the second base fabric, for preventing ambient light from entry into the cassette shell between the first and second walls, the second group of pile threads being bent in a V-shape.

In an attacher apparatus of the present invention, a fabric supplier supplies the light-trapping fabric, the pile threads of the light-trapping fabric being previously bent in a position thereof. A pressing roller presses the light-trapping fabric against the first or second wall, to attach the second surface to the passage port, the pressing roller contacting the pile threads for enlarging an extent of bending the pile threads during the attachment to impart a V-shape to the pile threads.

BRIEF DESCRIPTION OF THE DRAWINGS

The above objects and advantages of the present invention will become more apparent from the following detailed description when read in connection with the accompanying drawings, in which:

FIG. 7 is an explanatory view in a plan, illustrating a station in the attacher apparatus where a pressing roller operates;

DETAILED DESCRIPTION OF THE PREFERRED EMBODIMENTS OF THE PRESENT INVENTION

Figure 1:
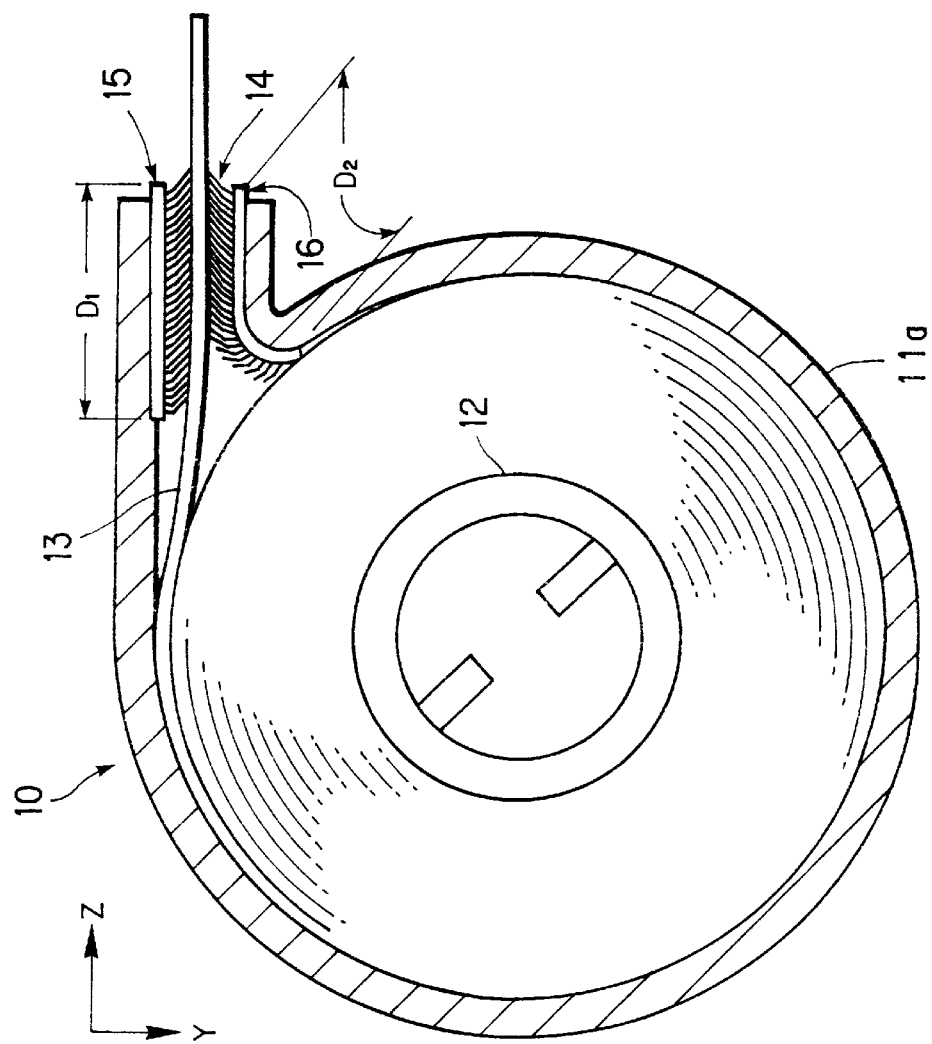
FIG. 1 is a cross section illustrating a photo film cassette.

In FIG. 1, a photo film cassette 10 consists of a cassette shell 11 and a spool 12 about which a strip of photo film 13 is wound and contained in the cassette shell 11. The cassette shell 11 consists of a tubular portion 11a and caps 10a and 10b (See FIG. 9) on respective ends of the tubular portion 11a. The tubular portion 11a is formed by rounding and bending a rectangular plate 25 of metal (See FIG. 7). Of course the caps 10a and 10b have respective holes, through which the spool 12 is rotatable. The photo film 13 is a 35 mm type. There is a photo film passage port 14 formed in the tubular portion 11a of the cassette shell 11. Light-trapping fabrics 15 and 16 or ribbons are attached to respective walls inside the passage port 14. The light-trapping fabric 15 has a width D1=11.5 mm. The light-trapping fabric 16 has a width D2=9.5 mm. They both protrude from the passage port 14 to a small extent. The light-trapping fabric 16 is equal to the light-trapping fabric 15 except for the width. Only the light-trapping fabric 15 is hereinafter described in relation to the present embodiment.

Continuous pile-knitted fabric 20 for the light-trapping fabrics 15 and 16 includes base fabric and pile threads 19. The continuous pile-knitted fabric 20 is constituted by the following threads:

Chain thread of the base fabric: polyester of 30 deniers and two yarns respectively having 18 filaments;

Inlay thread of the base fabric: polyester of 30 deniers and 18 filaments;

Regular thread of the pile threads 19: polyester of 50 deniers and 36 filaments;

Crimp thread of the pile threads 19: polyester of 75 deniers and 24 filaments.

Figure 2:
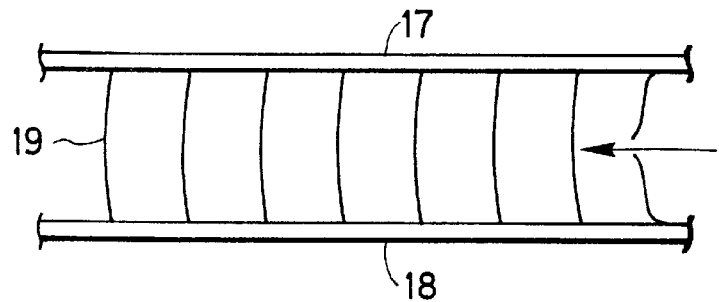
FIG. 2 is a side elevation illustrating a combination of two continuous pile-knitted fabrics as produced by a double raschel knitting machine.

To knit the continuous pile-knitted fabric 20, a double raschel knitting machine is used to form the state of FIG. 2, where base fabrics 17 and 18 are interconnected by the pile threads 19. The pile threads 19 are then cut in the central position in the arrow direction as indicated. After the center cutting, the pile threads 19 have a length of 2.0–2.5 mm, and knitting density of approximately 40,000 threads per $cm^2$.

Figure 3:
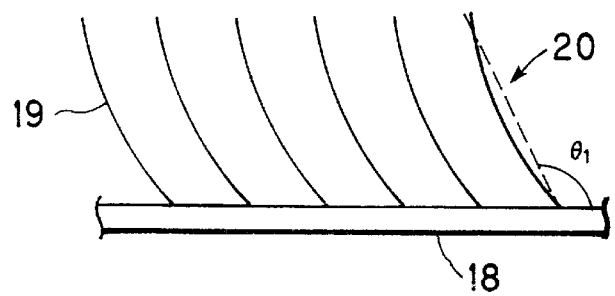
FIG. 3 is a side elevation illustrating one of the continuous pile-knitted fabric subsequent to the center cutting.

At the time of knitting the pile-knitted fabric 20 as continuous fabric, the pile threads 19 are originally inclined with respect to the base fabrics 17 and 18. After the center cutting, the pile threads 19 are released from the tensile force having been applied to the tip portions of the pile threads 19 as depicted in FIG. 3. In this initial state, the pile threads 19 are inclined at an angle $\theta 1$ of 110–130° with respect to the base fabric 18 of the continuous pile-knitted fabric 20.

Figure 4:
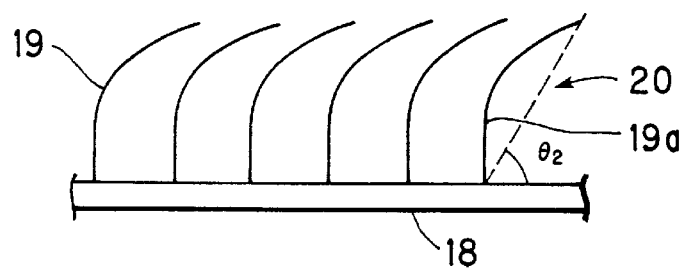
FIG. 4 is a side elevation illustrating the one continuous pile-knitted fabric subsequent to the pre-brushing.

Then the pile threads 19 of the continuous pile-knitted fabric 20 are pre-brushed in a direction opposite to the inclination of the pile threads 19. In FIG. 4, tips of the pile threads 19 are regularized at an angle $\theta 2$ of 50–60°, with which the middle of the pile threads 19 is bent at a bend portion 19a.

Figure 5:
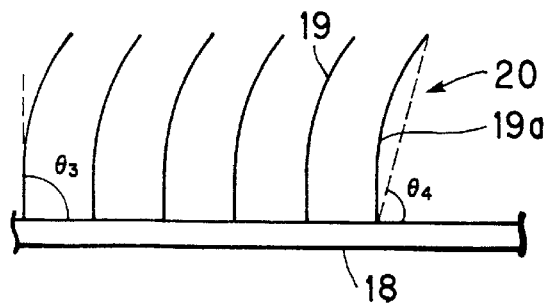
FIG. 5 is a side elevation illustrating the one continuous pile-knitted fabric subsequent to the final brushing.

Then the continuous pile-knitted fabric 20 is subjected to a preset process in which the continuous pile-knitted fabric 20 is heated to fix the shape of the pile threads 19. Finally the continuous pile-knitted fabric 20 is subjected to a final brushing process for regularization of the pile threads 19. In FIG. 5, an angle $\theta 3$ of the root portions of the pile threads 19 is 90–95°. An angle $\theta 4$ of the tip portions of the pile threads 19 is 70–75°. Note that, for each of the pre-brushing process and the final brushing process, a wire brush roller is used, and is disposed obliquely with respect to a conveying direction longitudinal to the continuous pile-knitted fabric 20, and is rotated in a direction opposite to the direction for conveying the continuous pile-knitted fabric 20. Accordingly the pile threads 19 are directed with an inclination with respect to the width direction of the continuous pile-knitted fabric 20.

A back surface of the base fabric 18 of the continuous pile-knitted fabric 20 is coated with filler of a vinyl acetate type at 40 $g/m^2$, and subsequently coated with hot-melt adhesive agent at 80 $g/m^2$, to obtain the light-trapping fabric 15 attachable to the passage port 14 of the cassette shell 11.

Figure 6:
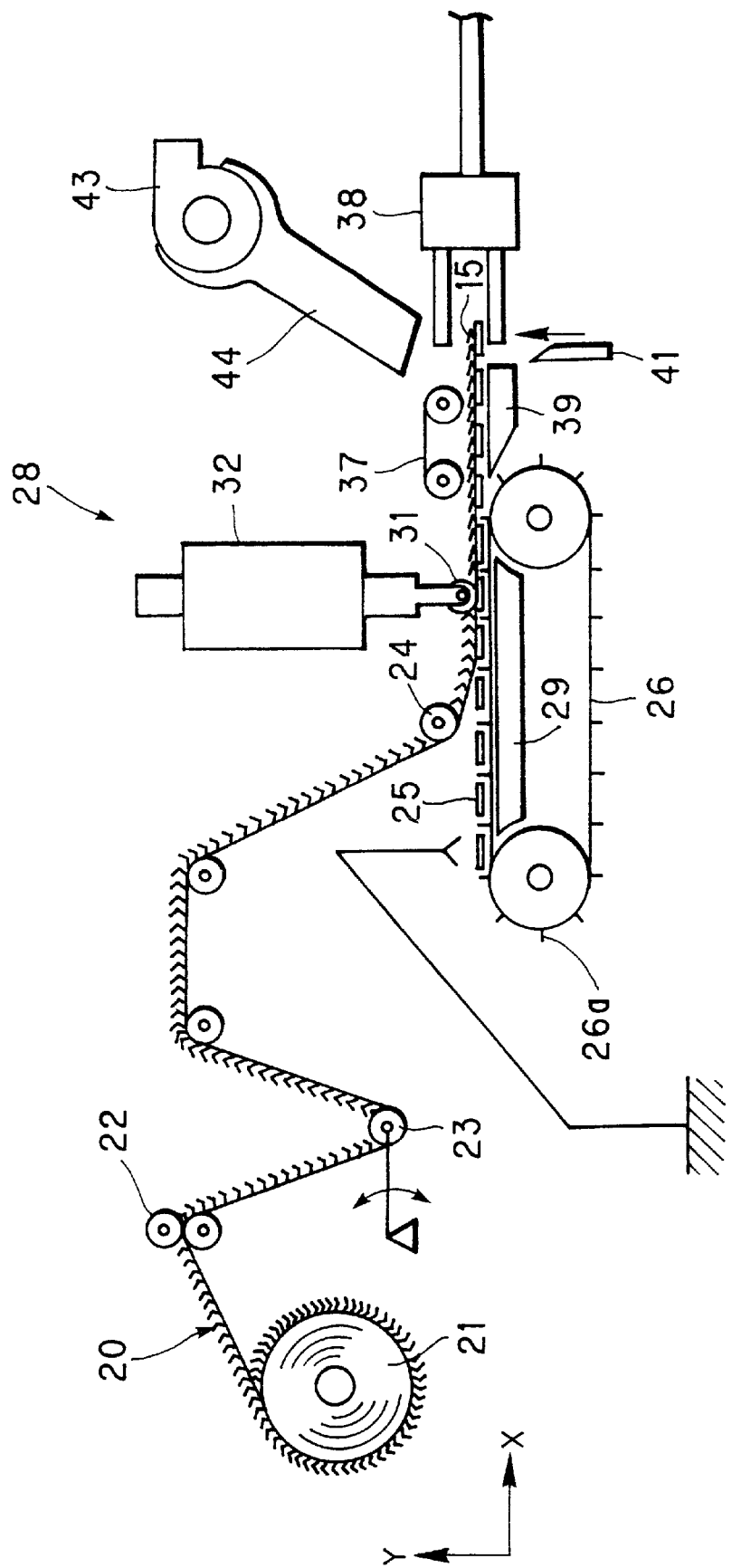
FIG. 6 is an explanatory view schematically illustrating an attacher apparatus of light-trapping fabric.

In FIG. 6, the continuous pile-knitted fabric 20 having been prepared is set in a roll form, and supplied from a supply drum 21 as a fabric supplier of an attacher apparatus 28. The continuous pile-knitted fabric 20 is drawn by a draw roller 22, and transferred to an attaching station by a dancer roller 23. The dancer roller 23 is disposed between the draw roller 22 and a feed roller 24. The draw roller 22 continuously conveys the continuous pile-knitted fabric 20. The feed roller 24 is near to the attaching station, and continuously conveys the continuous pile-knitted fabric 20. The draw roller 22 and the feed roller 24 apply tension to the continuous pile-knitted fabric 20 in a suitable manner.

The rectangular plate 25 (See FIG. 7) for forming the tubular portion 11a of the cassette shell 11 is supplied to a plate conveyor 26 and between partitions 26a one after another. A plurality of the rectangular plates are arranged at a pitch of the partitions 26a, and conveyed to the attaching station. The plate conveyor 26 is continuously driven in synchronism with the feed roller 24. Inside the plate conveyor 26 is disposed a hot plate 29 as heater, which applies heat to the hot-melt adhesive agent on the base fabric 18 of the continuous pile-knitted fabric 20 to melt and reactivate it. Over the plate conveyor 26 is disposed a pressing roller 31. A vertical position of the pressing roller 31 is adjusted by operation of an elevator 32 in accordance with factors including a thickness of the continuous pile-knitted fabric 20, so that the pressure applied to the continuous pile-knitted fabric 20 is changeable. This pressure of the pressing roller 31 to the continuous pile-knitted fabric 20 is in a range of 100–400 g/cm$^2$.

Figure 7A:
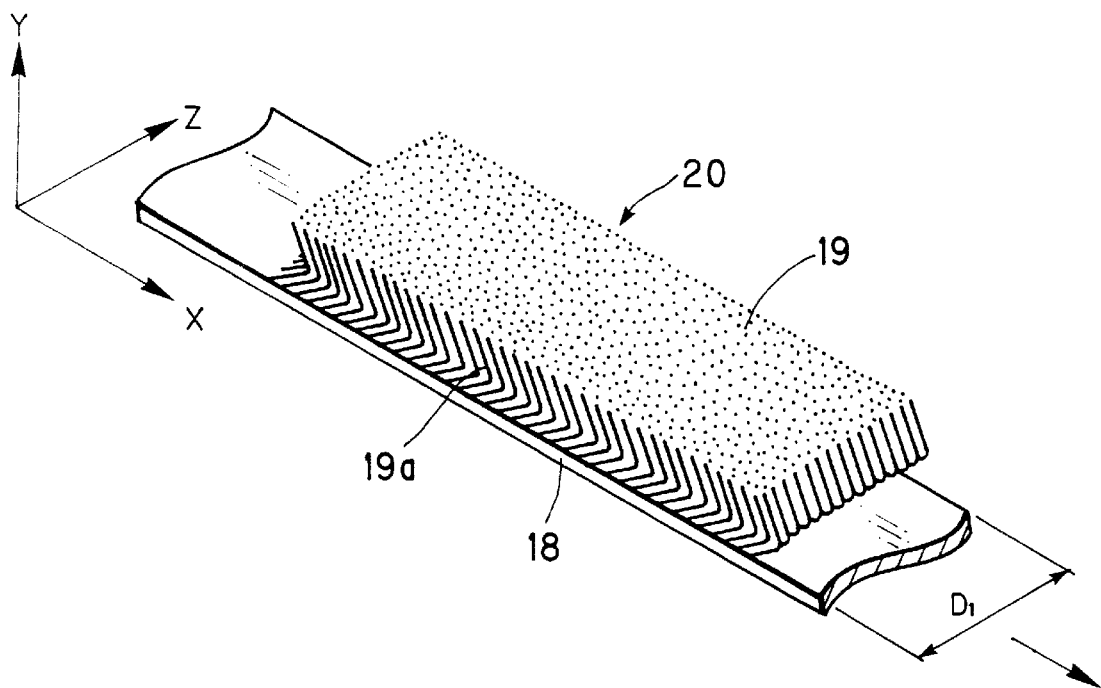
FIG. 7A is a partial perspective illustrating the continuous pile-knitted fabric.

In FIG. 7A, directions of arrows X, Y and Z are indicated for depiction of the continuous pile-knitted fabric 20 in a three-dimensional manner. The arrow X indicates a direction of conveying the continuous pile-knitted fabric 20. The arrow Y indicates a direction perpendicular to the base fabric 18. The arrow Z indicates a width direction of the continuous pile-knitted fabric 20. In the state after adhesion of the light-trapping fabric 15 to the passage port 14, the arrow X indicates a width direction of the photo film 13 passed through the passage port 14. The arrow Y indicates a direction from the light-trapping fabric 15 toward the light-trapping fabric 16 confronted therewith in the passage port 14. The arrow Z indicates an outward direction at the passage port 14 relative to the cassette shell 11.

Figure 8:
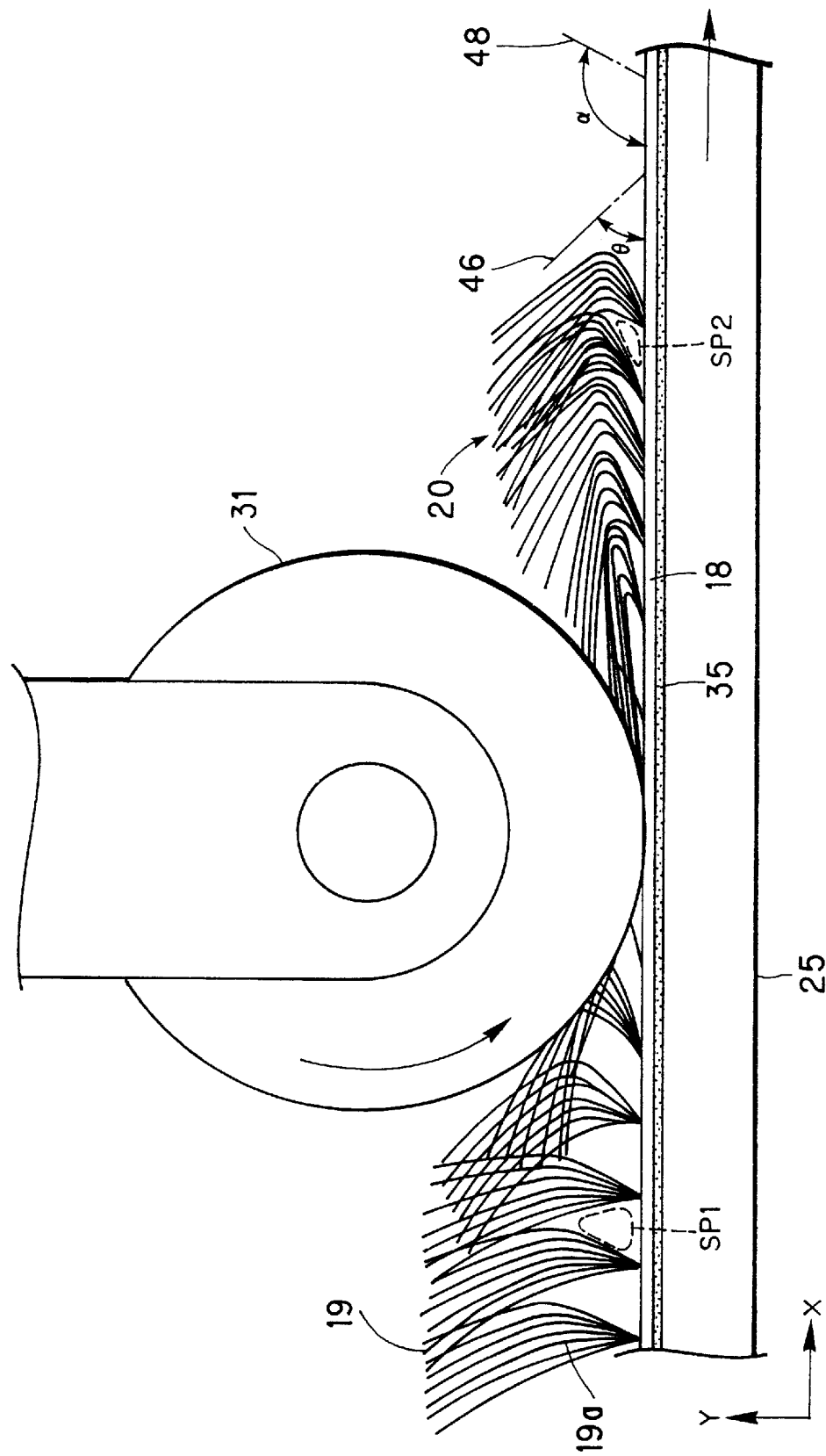
FIG. 8 is a partial side elevation illustrating the station of the pressing roller with the continuous pile-knitted fabric.

In the light-trapping fabric 15 of the present invention, after application of pressure of the pressing roller 31, the tip portions of the pile threads 19 higher than the bend portion 19a are inclined in a direction opposite to the arrow X relative to the base fabric 18, and are inclined in the direction of the arrow Z relative to the base fabric 18. In FIG. 8, an angle θ is defined between the tip portions and the base fabric 18 in relation to the direction of the arrow X.

Note that, in the light-trapping fabric 15 after application of pressure of the pressing roller 31, the root portions of the pile threads 19 under the bend portion 19a may have any inclination relative to the base fabric 18. Preferably, the root portions of the pile threads 19 can be inclined in the direction of the arrow X relative to the base fabric 18, or can define a right angle with respect to the arrow X and only with an inclination in the direction of the arrow Z relative to the base fabric 18.

Of course an intermediate angle defined between each tip portion and each root portion is preferably an obtuse angle, but may be an acute angle or a right angle.

Heat from the hot plate 29 reactivates and melts hot-melt adhesive agent 35. In FIG. 8, the pressing roller 31 presses the continuous pile-knitted fabric 20 against the rectangular plate 25, 50 that the hot-melt adhesive agent 35 causes the continuous pile-knitted fabric 20 to adhere to the rectangular plate 25 in a predetermined position (See FIG. 7). At the same time, the pressure of the pressing roller 31 flexes the pile threads 19 to such a great extent that the pile threads 19 are nearly folded down. Between the root portions of the pile threads 19, there is a space SP2 which is reduced below an initially larger space SP1. Therefore it is possible to shield ambient light between the root portions of the pile threads 19 in a more reliable manner. Resistance to drawing the photo film 13 is reduced. Note that, in FIG. 7, the pile threads 19 are omitted from depiction. An additional line 46 in FIG. 8 indicates a second direction parallel with the tip portions of the pile threads 19, to clarify the pile threads 19.

The angle θ of the tip portions of the pile threads 19 in FIG. 8, with respect to the base fabric 18 after the contact of the pressing roller 31, affects the torque required for drawing the photo film out of the cassette after the manufacture, the torque required for winding the photo film into the cassette in the manufacturing process, and a light-shielding capacity between the root portions of the pile threads 19. Experiments were conducted so that results were obtained as indicated in Table 1 below. In Table 1, evaluations are indicated by grades of 1 as excellent, 2 as good, 3 as passing, and 4 as failing. In the experiments, the pile threads 19 were all equally long in a range of 1.7–2.0 mm.

TABLE 1

| Angle θ (°) | 45 | 60 | 75 | 90 |
|---|---|---|---|---|
| Drawing torque after the manufacture | 1 | 2 | 3 | 4 |
| Winding torque in the manufacturing process | 4 | 3 | 2 | 1 |
| Light-shielding capacity between the pile roots | 1 | 2 | 3 | 4 |

In Table 1, the drawing torque and the light-shielding capacity between the pile roots were the best when θ=45°. But the light-shielding capacity in the passage port 14 was poor because of great gaps between the tip portions of the pile threads 19. It is concluded that the optimum range of θ is 60–75°. Note that an additional line 48 indicates a first direction parallel with the root portions of the pile threads 19, to clarify the pile threads 19. It was also found that an angle Γ indicated by the additional line 48 for the root portions of the pile threads 19 with respect to the base fabric 18 had an optimum range of 90–110°.

Figure 9:
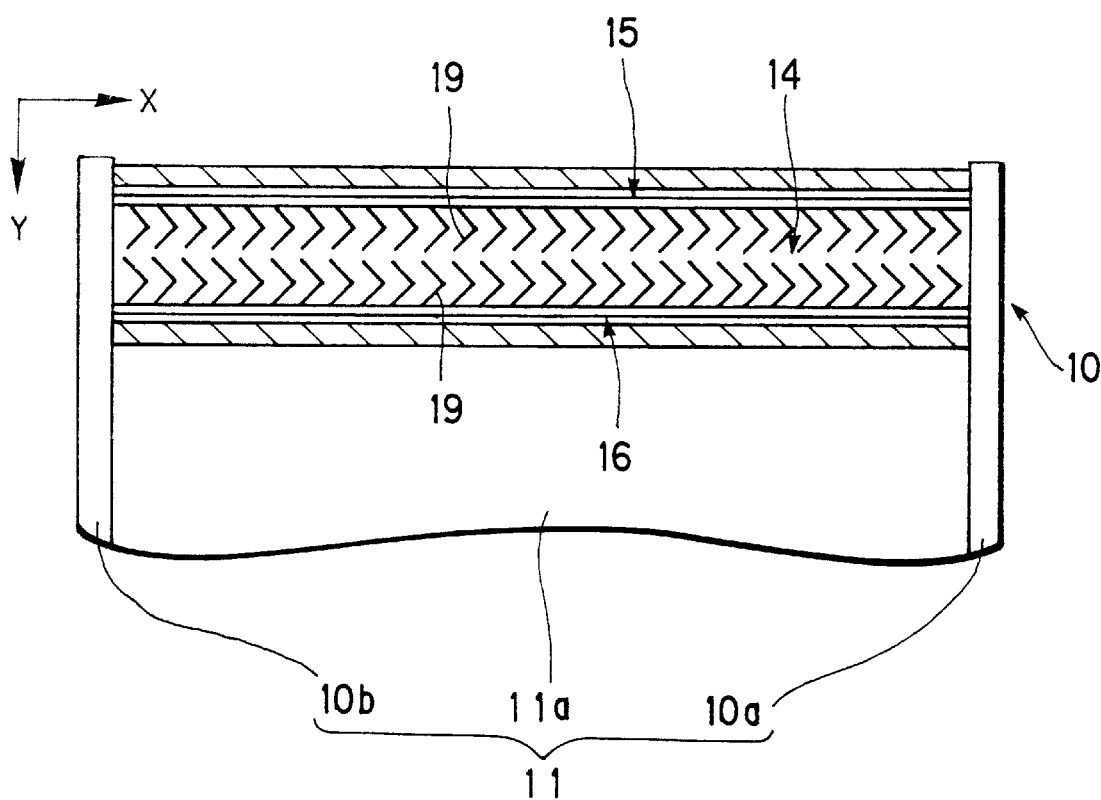
FIG. 9 is a partial front elevation illustrating the photo film cassette.

As viewed in plan in which the light-trapping fabric 15 is placed horizontally, the pile threads 19 have the inclination such that the pile threads 19 are oblique with respect to the width direction (arrow Z) of the light-trapping fabric 15. In FIG. 9, each of the pile threads 19 has a V-shape as viewed in the front elevation of the passage port 14. In FIG. 1, each of the pile threads 19 is inclined toward the outside of the passage port 14 (arrow Z) as viewed in the cross section of the photo film cassette 10.

There are a transfer belt 37 and a transfer hand 38 arranged downstream (arrow X) from the attaching station. The transfer belt 37 is continuously driven in synchronism with conveyance of the feed roller 24, to convey the rectangular plate 25 with the continuous pile-knitted fabric 20 to a cutting station. When the rectangular plate 25 is protruded from a support rail 39 under the transfer belt 37, the rectangular plate 25 is held by the transfer hand 38. Instantaneously a cutter 41 is moved upwards (arrow Y) to cut the light-trapping fabric 15 from the continuous pile-knitted fabric 20 on the side of the base fabric 18 and in a position between the plural plates. Note that there is a dust collector 43 arranged over the cutting station. The dust collector 43 has a nozzle 44 through which the dust collector 43 collects dust of pile threads from the light-trapping fabric 15.

Similarly the light-trapping fabric 16 is attached to an opposite side of the rectangular plate 25. The rectangular plate 25 is rounded and bent to confront the light-trapping fabric 15 and 16 with each other as illustrated in FIG. 1, and to form the tubular portion 11a having the passage port 14. The spool 12, on which a trailing end of the photo film 13 is retained, is inserted into the tubular portion 11a, which is closed by fitting the caps 10a and 10b thereon. Then the spool 12 is rotated to wind the photo film 13 into the cassette shell 11 in a roll form, to complete the photo film cassette 10.

Figure 10A:
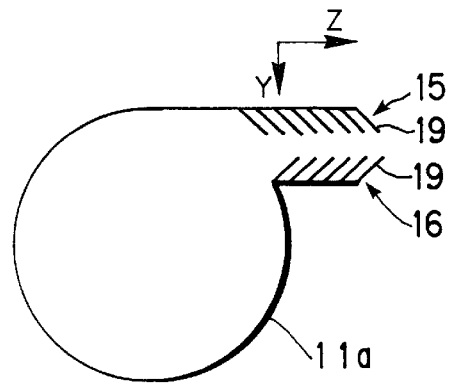
FIG. 10A is an explanatory view in section, illustrating directions of the pile threads of the light-trapping fabrics.
Figure 10B:
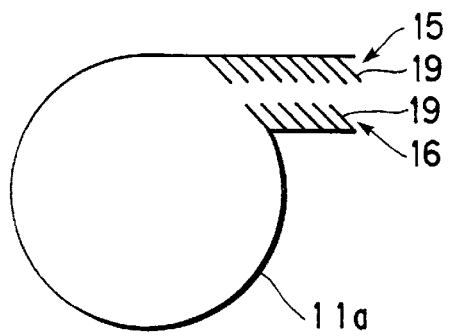
FIG. 10B is an explanatory view in section, illustrating another preferred embodiment with different directions of the pile threads.
Figure 10C:
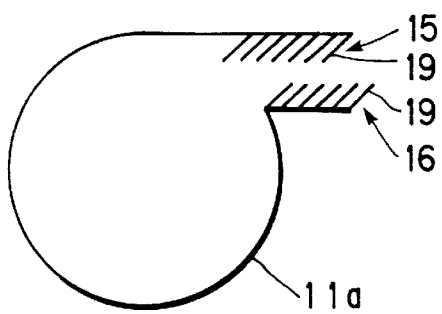
FIGS. 10C and 10D are explanatory views in section, illustrating comparable examples in which directions of the pile threads are differently set.
Figure 10D:
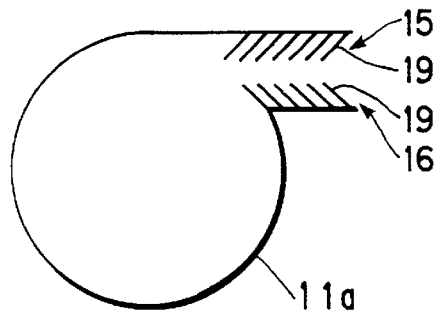

Note that the torque required for drawing the photo film out of the cassette after the manufacture, and the torque required for winding the photo film into the cassette in the manufacturing process, are different according to directions of the pile threads 19. Experiments were conducted in relation to this, to obtain results indicated in Table 2 below. Note that Examples A, B, C and D are depicted respectively in FIGS. 10A–10D. In FIG. 10A, Example A has the light-trapping fabrics 15 and 16 both with the pile threads 19 directed outwards (arrow Z). In FIG. 10B, Example B has the light-trapping fabric 15 with the pile threads 19 directed outwards (arrow Z) and the light-trapping fabric 16 with the pile threads 19 directed inwards (opposite to the arrow Z). In FIG. 10C, Example C has the light-trapping fabric 15 with the pile threads 19 directed inwards (opposite to the arrow Z) and the light-trapping fabric 16 with the pile threads 19 directed outwards (arrow Z). In FIG. 10D, Example D has the light-trapping fabrics 15 and 16 both with the pile threads 19 directed inwards (opposite to the arrow Z).

TABLE 2

| Examples | A | B | C | D |
| --- | --- | --- | --- | --- |
| Drawing torque after the manufacture (in g · cm) | 180, Good | 200, Good | 380, Failing | 400, Failing |
| Winding torque in the manufacturing process (in g · cm) | 180, Good | 220, Passing | 150, Good | 150, Good |
| Results of evaluation | Good | Passing | Failing | Failing |

It is concluded that Example A was found excellent in view of the small torque. Example C is a type used widely today, but was found to have too great a torque for drawing the photo film 13, because of likeliness of entanglement between the pile threads.

Note that, in the above embodiment, the photo film cassette 10 contains the photo film in the roll form. The present invention is applicable to a magazine for containing photographic paper, or other containers for containing photo-sensitive material In the above embodiment, the light-trapping fabric 15 is cut from the continuous pile-knitted fabric 20 in positions between adjacently arranged rectangular plates after adhesion to the rectangular plate 25. Alternatively it is possible to attach the light-trapping fabric 15 to the rectangular plate 25 after cutting the light-trapping fabric 15 from the continuous pile-knitted fabric 20 at a regular length associated with a range of the passage port 14. A robot hand may be used for placing the pre-cut piece of the light-trapping fabric 15 on the passage port 14 before applying pressure of the pressing roller 31 to the light-trapping fabric 15.

In the above embodiment, the continuous pile-knitted fabric 20 is initially knitted only with a width of the light-trapping fabric 15, so that no continuous fabric with a great width is used. There is no operation of slitting the continuous fabric for the purpose of produce plural strips of narrow continuous fabrics from the wide fabric. This use of the narrowly knitted continuous fabric is advantageous, because the slitting operation would cause problems of unwanted dust of piles and frays along edges of the slitted narrow fabrics. Of course the present invention is applicable to the use of widely knitted continuous fabric, which may be slitted into plural strips of narrow continuous fabrics.

In the above embodiment, the light-trapping fabrics 15 and 16 are knitted fabric. Alternatively the light-trapping fabrics 15 and 16 may be woven fabric. In either structure of fabric, the inclination of the pile threads 19 in a widthwise direction (arrow Z) with respect to the continuous conveyance is created by a brushing process. With the knitted fabric, it is also possible to create an inclination of the pile threads 19 in the widthwise direction (arrow Z) by suitably changing the knitting structure of threads of the fabric. In relation to the longitudinal direction (arrow X) of the fabric with respect to the continuous conveyance, it is preferable to incline both the root portions and the tip portions by the above-mentioned brushing processes for either of the knitted and woven structures. In FIGS. 6 and 7, the bend portion 19a of the pile threads 19 is bent nearly in an angular manner, but may be bent in a curved manner.

In the above embodiment, the continuous pile-knitted fabric 20 is conveyed horizontally (arrow X) while the pressing roller 31 is immovable with respect to the horizontal direction (arrow X). Alternatively the pressing roller 31 may be moved horizontally (opposite to the arrow X) with the continuous pile-knitted fabric 20 which may be stationary with respect to the horizontal direction (arrow X).

In the above embodiment, both the light-trapping fabrics 15 and 16 has the pile threads 19 bent in the V-shape. Alternatively only one of the light-trapping fabrics 15 and 16, for example only the light-trapping fabric 15, can have the pile threads 19 bent in the V-shape. The pile threads 19 of the other of the light-trapping fabrics 15 and 16 may not have the V-shape but a straight shape or a loosely curved shape.

In the above embodiment, only the attacher apparatus for the light-trapping fabric 15 for the upside of the passage port 14 has been described. Note that the light-trapping fabric 16 for the downside of the passage port 14 is attached by an attacher apparatus which is similar to the above but in which the rectangular plate 25 is differently oriented. The continuous fabric for the light-trapping fabric 16 is different from that for the light-trapping fabric 15 in the following respects: The continuous fabric for the light-trapping fabric 16 has a width smaller than that for the light-trapping fabric 15. Also, the continuous fabric for the light-trapping fabric 16 has the pile threads 19 directed upstream with an inclination different from an inclination with which the pile threads 19 of the continuous pile-knitted fabric 20 for the light-trapping fabric 15 are directed upstream (opposite to the arrow X).

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette, including a spool about which photo film is wound in a roll form, and a cassette shell for containing said spool in a rotatable manner, said cassette shell including a passage port which has first and second walls between which said photo film is passed, said photo film cassette comprising:

two light-trapping fabrics secured respectively to said first and second walls, each of said fabrics respectively including:

(a) a base fabric attached to at least one of said first and second walls; and (b) pile threads, disposed to protrude from said base fabric, for preventing ambient light from entry into said cassette shell through said passage port, said pile threads being bent in a V-shape;

wherein each said base fabric has first and second surfaces; and each of said pile threads includes:

a root portion, disposed to extend from said first surface, and inclined in a first direction on said first surface; and a tip portion, disposed to extend from said root portion, and inclined in a second direction opposite to said first direction.

2. A photo film cassette as defined in claim 1, wherein said second direction is determined in a horizontal direction of said photo film in said passage port.

3. A photo film cassette as defined in claim 2, wherein said pile threads satisfy a condition of:

$$60° \leq \theta \leq 75°$$

where θ is an angle defined between said second direction and said base fabric as viewed in a direction outwards through said passage port with respect to said cassette shell.

4. A photo film cassette as defined in claim 1, wherein said second direction is determined outwards through said passage port with respect to said cassette shell.

5. A photo film cassette as defined in claim 1, wherein said second direction is determined outwards through said passage port with respect to said cassette shell, and also determined inclined with respect to a longitudinal direction of said photo film.

6. A photo film cassette, including a spool about which photo film is wound in a roll form, and a cassette shell for containing said spool in a rotatable manner, said cassette shell including a passage port which has first and second walls between which said photo film is passed, said photo film cassette comprising:

a first light-trapping fabric, including:
   (a) a first base fabric attached to said first wall; and
   (b) a first group of pile threads, disposed to protrude from said first base fabric, for preventing ambient light from entry into said cassette shell between said first and second walls; and a second light-trapping fabric, including:
   (A) a second base fabric attached to said second wall; and
   (B) a second group of pile threads, disposed to protrude from said second base fabric, for preventing ambient light from entry into said cassette shell between said first and second walls, each pile thread of said second group of pile threads being bent in a, V-shape between a root portion and a tip portion.

7. A photo film cassette, including a spool about which photo film is wound in a roll form, and a cassette shell for containing said spool in a rotatable manner, said cassette shell including a passage port which has first and second walls between which said photo film is passed, said photo film cassette comprising:

two light-trapping fabrics secured respectively to said first and second walls, each of said fabrics respectively including:
   (a) a base fabric attached to at least one of said first and second walls; and
   (b) pile threads, disposed to protrude from said base fabric, for preventing ambient light from entry into said cassette shell through said passage port, each said pile thread being bent in a V-shape between a root portion and a tip portion.

* * * * *

UNITED STATES PATENT AND TRADEMARK OFFICE
CERTIFICATE OF CORRECTION

PATENT NO. : 5,971,311
DATED : October 26, 1999
INVENTOR(S) : Akihiko FUJII, TOMODA, MASAZUMI It is certified that error appears in the above-indentified patent and that said Letters Patent is hereby corrected as shown below:

On the Title Page:

In the first name of the second listed inventor, please delete "Masazumj" and insert therefor --Masazumi--.

Signed and Sealed this

Third Day of April, 2001

*Attest:*

NICHOLAS P. GODICI

*Attesting Officer*      *Acting Director of the United States Patent and Trademark Office*